Jan. 29, 1957
H. S. BLACK
2,779,925
COMPOSITE COAXIAL RESONATOR
Filed Sept. 29, 1951
2 Sheets-Sheet 1
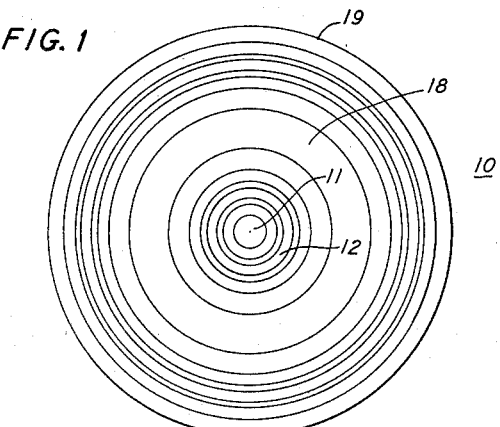
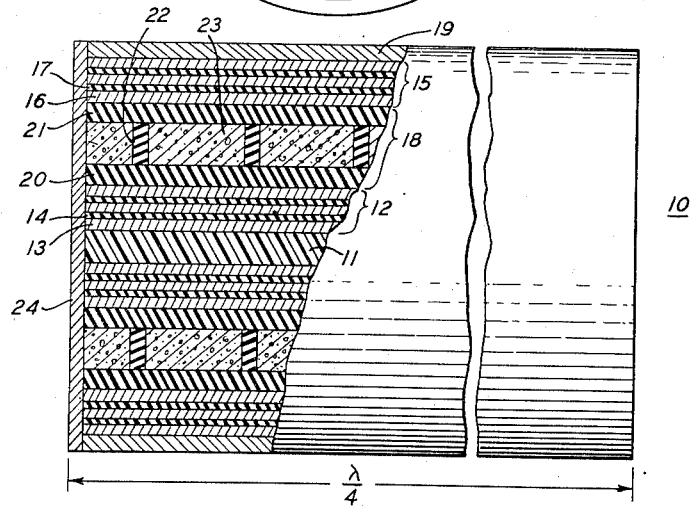
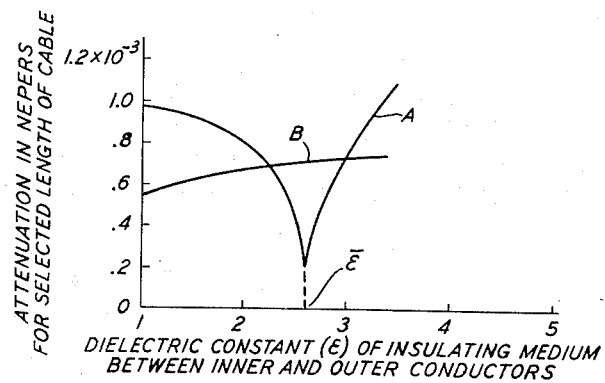
INVENTOR
*H. S. BLACK*
BY
*Hugh S. Wertz*
ATTORNEY Jan. 29, 1957 — H. S. BLACK — 2,779,925
COMPOSITE COAXIAL RESONATOR
Filed Sept. 29, 1951 — 2 Sheets-Sheet 2

INVENTOR
H. S. BLACK
BY Hugh S. Wertz
ATTORNEY

United States Patent Office 2,779,925
Patented Jan. 29, 1957

2,779,925
COMPOSITE COAXIAL RESONATOR

Harold S. Black, New Providence, N. J., assignor to Bell Telephone Laboratories, Incorporated, New York, N. Y., a corporation of New York Application September 29, 1951, Serial No. 248,951

1 Claim. (Cl. 333—82)

This invention relates to electrical conductors and more specifically to composite conductors formed of a pair of composite conducting members separated by an intermediate dielectric member.

It is an object of this invention to improve the current distribution in conductors of the above-mentioned type and particularly to effect such improvement by the novel construction of the intermediate dielectric member.

In a copending application of A. M. Clogston, Serial No. 214,393, filed March 7, 1951, there are disclosed a number of composite conductors, each of which comprises a multiplicity of insulated conducting elements of such number, dimensions, and disposition relative to each other and to the orientation of the electromagnetic wave being propagated therein as to achieve a more favorable distribution of current and field within the conducting material. In one specific embodiment disclosed in Figs. 7A and 7B of the Clogston application, two coaxially arranged composite conductors are separated by an intermediate dielectric member, each of the composite conductors comprising a multiplicity of thin metal laminations insulated from one another by layers of insulating material, the smallest dimension of each of the laminations being in the direction perpendicular to both the direction of wave propagation and the magnetic vector. Each metal lamination is many times (for example 10, 100 or even 1000 times) smaller than the factor $\delta$ which is called one skin thickness or one skin depth. The distance $\delta$ is given by the expression $$\sqrt{\frac{1}{\pi f \mu \sigma}} \quad (1)$$

where $\delta$ is expressed in meters, $f$ is the frequency in cycles per second, $\mu$ is the permeability of the metal in henries per meter and $\sigma$ is the conductivity in mhos per meter. The factor $\delta$ measures the distance in which the current and field penetrating into a slab of the metal many times $\delta$ in thickness will decrease by one neper; i. e., their amplitude will become equal to $$\frac{1}{e} = 0.3679 \ldots \text{ times}$$

their amplitude at the surface of the slab.

It is pointed out in the above-identified copending application that when a conductor has such a laminated structure, a wave propagating along the conductor at a velocity in the neighborhood of a certain critical value will penetrate further into the conductor (or completely through it) than it would penetrate into a solid conductor of the same material, resulting in a more uniform current distribution in the laminated conductor and consequently lower losses. The critical velocity for the type of structure just described is determined by the thickness of the metal and insulating laminae and the dielectric constant of the insulating laminae in the composite conductors. The critical velocity can be maintained by making the dielectric constant of the main dielectric, that is, the dielectric material intermediate the two composite conductors, equal to $$\epsilon_1 = \epsilon_2 \left(1 + \frac{W}{t}\right) \quad (2)$$

wherein $\epsilon_1$ is the dielectric constant of the main dielectric element between the two composite conductors in farads per meter, $\epsilon_2$ is the dielectric constant of the insulating material between the laminae of the conductors in farads per meter, W is the thickness of one of the metal laminae in meters, and $t$ is the thickness of an insulating lamina in meters. The insulating laminae are also made very thin and an optimum condition for certain structures of this general type to produce minimum loss in the useful lower frequency range is that in which each insulating lamina is one-half the thickness of a metal lamina. Other optima exist for other assumed conditions and objectives.

For long cables of the type just described the main dielectric member preferably is of a dielectric of the proper dielectric constant to give optimum velocity of propagation and which completely fills the space between the two coaxially arranged composite conductors. However, where short lengths of such cables are used, such as, for example, in resonators and antennas, and these are made up in a variety of diameters and lengths, it is sometimes not practical to maintain the rather accurate controls necessary to provide the exact dielectric constant required. The present invention, in one of its more important aspects, relates to a structure of the composite conductor type in which the intermediate or main dielectric member is formed of a hollow dielectric cylinder surrounding the inner composite conductor but taking only part of the space between the two composite conductors, and a multiplicity of dielectric spacers surrounding the dielectric cylinder, the number and position of which can be varied to give a fine control and, hence, a very accurate value of dielectric constant. The remainder of the space in the main dielectric member is occupied by a low loss, low dielectric constant insulator such as air or essentially air if partially or wholly occupied by an appropriate dielectric foam, for example, polystyrene foam. If now the above-mentioned hollow dielectric cylinder and spacers are composed of a sufficiently low loss insulator of high dielectric constant such as titanium dioxide which has a relative dielectric constant of around 100 and a loss tangent comparable to polystyrene and other low loss insulators, then the effective loss tangent of the main dielectric member will be very much smaller because most of the energy storage will be in the space occupied by air. Other things being equal, the improvement will be greater the greater the dielectric constant of the hollow dielectric cylinder.

In the description below, the composite conductors are in the form of quarter wave resonators each with one end of the conductors short-circuited, but it will be understood that the principles of the invention are equally applicable to other types of resonators and to other forms of conductors as well.

The invention will be more readily understood by referring to the following description taken in connection with the accompanying drawing forming a part thereof, in which:

Fig. 1 is an end view of a coaxial composite conductor in accordance with the invention, comprising two separated composite conductors, the space therebetween containing a novel intermediate dielectric member;

Fig. 2 is a longitudinal view, with portions broken away, of the composite conductor of Fig. 1;

Fig. 5 is a graphical representation to aid in the description of the invention.

Figure 3:
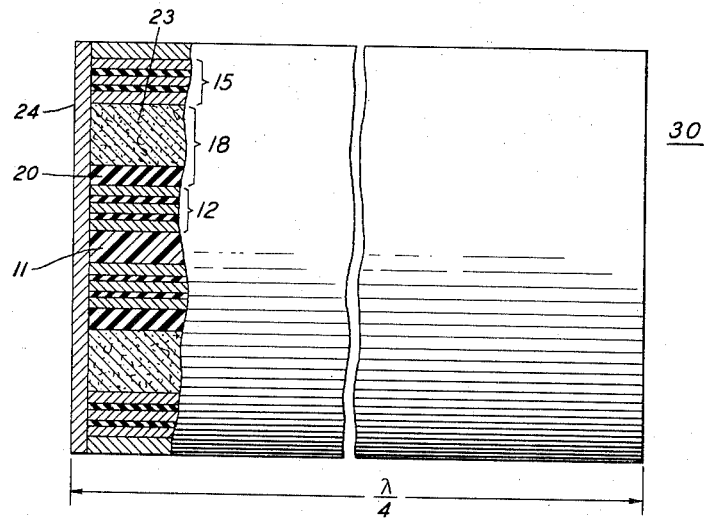
Fig. 3 is a longitudinal view of a modification of the embodiment shown in Figs. 1 and 2.

Referring more particularly to the drawings, Figs. 1 and 2 show, by way of example, a conductor 10 in accordance with the invention, Fig. 1 being an end view taken from the right in Fig. 2 and Fig. 2 being a longitudinal view. The conductor 10 comprises a central core 11 (which may be either of metal or dielectric material but which by way of example has been shown as dielectric material), an inner composite conductor or stack 12 formed of many laminations of conducting material 13 spaced by laminations of insulating material 14, an outer composite conductor or stack 15 formed of a mutliplicity of laminations of conducting material 16 spaced by laminations of insulating material 17 and separated from the inner conductor 12 by a composite intermediate dielectric member 18, and an outer sheath 19 of metal of other suitable shielding material. The dielectric member 18 comprises an inner dielectric cylinder 20, an outer dielectric cylinder 21 and a plurality of dielectric spacers 22 between the members 20 and 21. If desired, the space between the discs 22 may be filled with foam material 23 such as polyethylene or polystyrene foam.

As discussed in the above-mentioned Clogston application, each of the conducting layers 13 and 16 is made thin compared to its appropriate skin depth. The insulating layers 14 and 17 are also preferably but not necessarily of comparable thinness with the conducting layers. Examples of satisfactory materials are: conductors—copper, silver and aluminum; and insulators—polyethylene, polystyrene and aluminum oxide. The inner conductor 12 has 10 or 100 or more conducting layers 13 and the outer conductor 15 has a somewhat similar number of conducting layers 16 although there need not be the same number of conducting layers as in the inner conductor 12. Since there are a large number of insulating and conducting layers in each stack (12 and 15), it makes no difference whether the first or last layer of each stack is of conducting or of insulating material.

The improvement forming the present invention is due to the novel construction of the intermediate dielectric member 18. Since dielectric members 20, 21 and 22 take up only part of the annular space between the stacks 12 and 15, a material can be used which is of fairly high dielectric constant and still have an overall dielectric constant for the entire annular space which is of the proper value to produce a velocity of propagation which matches that in the stacks and thus satisfy the so-called "Clogston condition" represented by Equation 2 given above. The cylinders 20 and 21 and the discs 22 can be of a material such as titanium dioxide which has a relatively high dielectric constant of around 100 and still have an average dielectric constant of the intermediate dielectric member 18 which can be varied anywhere between one and four and one half, for example. It can be shown that where a material is used, in a manner similar to that described above, in the central dielectric member 18 which has a very high dielectric constant (compared to that of the over-all member 18), the dielectric losses are greatly reduced.

In making the composite conductor shown in Figs. 1 and 2, the stack 12 is formed in any suitable manner around the central core 11. By way of example, it can be formed by any of the methods disclosed in the above-identified Clogston application. A cylinder 20 of titanium dioxide is extruded on the stack 12, and the discs 22 are applied to the cylinder 20 and their number and spacing are varied to obtain a vernier adjustment of the dielectric constant. The discs 22 may be slotted so that they can be easily slipped over the stack 12 and the cylinder 20 and the slot filled by a wedge insert. By way of example, if calculations determine an optimum spacing of the discs 22 and a test of a short section of the cable shows the dielectric constant to be larger or smaller than desired, then the number and/or spacing of the discs 22 can be varied in the section of cable then being fabricated. The space between the discs 22 can be filled with polyethylene or polystyrene or aluminum oxide foam or left open, as desired. When the space is filled with foam, the outer cylinder 21 of titanium dioxide can then be extruded over the discs 22. In some cases this latter step can be preceded by a step in which a thin cylinder of polystyrene or other foam is extruded around the discs 22 prior to the formation of the outer tube 21.

The arrangement of Fig. 2 is shown as a resonator, the length being made a quarter wavelength of the desired frequency at which the cable section resonates. The resonator can either be open-circuited at both ends, short-circuited at both ends or short-circuited at one end only. The latter arrangement has been chosen for illustration in Fig. 2 which shows a plate 24 at the left-hand end of the conductor 10. The conductor 10 because of its lower loss has a correspondingly higher Q when used as a resonator and this has widespread advantages because resonators are used for many different purposes. For most resonator applications, including their use as resonant-line oscillators, elements of filters and impedance transformers, the resonator is more useful the higher its Q.

Fig. 3 shows a conductor 30 which is similar to the conductor 10 except that the intermediate dielectric member 18 comprises a cylinder 20 of high dielectric constant material, such as for example titanium dioxide, and a filling for the rest of the annular space between the stacks 12 and 15 (or a portion only of it) of polyethylene or polystyrene foam or any other suitable dielectric material which has a lower dielectric constant than the dielectric constant which would produce the correct velocity of propagation to match that in the stacks 12 and 15. In other words, the dielectric constant of the material 20 is much higher than the over-all dielectric constant desired, while the dielectric constant of the material 23 is less than the over-all dielectric constant desired, but by proper proportioning of the materials 20 and 23 within the annular space between the stacks 12 and 15 an over-all velocity of propagation of the desired value can be obtained. To insure low dielectric loss, that is, a small effective loss tangent in the main dielectric member, the ratio of the dielectric constant to loss tangent of material 20 should be as high as possible while the loss tangent of material 23 should be negligible and preferably its dielectric constant as small as possible.

Obviously, variations of the structure of Fig. 3 are possible. One example is an arrangement in which the relative positions of the members 20 and 23 are reversed. Another alternative is to provide foam on both sides of the member 20 in Fig. 3 rather than on one side only. Still another structure includes high dielectric constant cylinders on both sides of the foam member 18.

Figure 4:
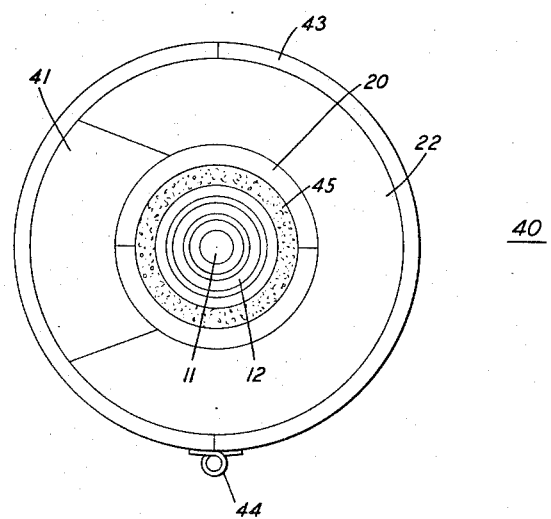
Fig. 4 is an end view of another embodiment of the invention.

Fig. 4 shows another embodiment of the invention. In this embodiment, the number and spacing of the discs 22 can be readily varied since each disc has a wedge shaped slot 41 therein so that it can be readily slipped over the stack and moved along the longitudinal axis of the conductor 40. In order to facilitate this movement after the inner stack has been fabricated, the outer stack 15 of the conductor 10 (in Fig. 1) has been replaced by a cylinder 43 of solid material which is formed in two parts connected by a hinge 44. This makes it possible to open the conductor and slide the discs 22 to the desired position. The cylinder 20 can be formed in two parts as shown in the drawing and slipped over the stack after the discs are in place. This cylinder 20 can either be contiguous to the stack 12 or separated therefrom by a foam cylinder 45. Similarly, each disc 22 with its wedge shaped slot 41 may be separated from cylinder 20 by a foam cylindrical separator instead of being continguous to cylinder 20. The structure 40 of Fig. 4 may have a short-circuiting plate 24 at one or both ends thereof, if desired, to form a resonator of one of these types.

Foam alone can be used for the main dielectric member. Titanium dioxide, as an example, can be so foamed as to have an effective dielectric constant to give the optimum phase velocity, and, as a result, there is a substantial reduction in dielectric loss but the loss improvement is less than those produced by the structures of Figs. 1 and 3.

Fig. 5 compares the attenuation of a selected length of a line of the type shown in Fig. 4 (curve A) with that of a conventional line (curve B) having a solid inner conductor of the same diameter, as the dielectric constant of the insulating material between the inner and outer conductors is varied by varying the number and spacing of the discs 22. The attenuation of the conductor 40 is seen to reach a minimum at $\epsilon = \bar{\epsilon}$, where $\bar{\epsilon}$ has the value given by the following equation:

$$\bar{\epsilon} = \epsilon_1 \left(1 + \frac{W}{t}\right) \quad (3)$$

The similarities between this equation and Equation 2 is obvious. This minimum value $\bar{\epsilon}$ is much less than that of the conventional coaxial conductor. Even for values of $\bar{\epsilon}$ appreciably different than $\bar{\epsilon}$ (as shown in Fig. 5), the conductor 40 has advantages over the conventional composite cable or resonator.

It is obvious that many changes can be made in the embodiments described above and it is intended to cover all such modifications as clearly fall within the scope of the invention as indicated by the claim. In the specification and claim, the term "foam" refers to any low-dielectric-constant insulator having negligible loss. Such materials are "composite" since they are mixture of solid and gaseous materials.

What is claimed is:

A resonator comprising in combination first and second coaxially arranged composite members, each of said composite members comprising a stack of insulated concentric thin walled conducting cylinders, each of said cylinders having at least one dimension in a direction substantially transverse to the direction of wave propagation down the length thereof which is small compared with its skin depth at the highest frequency of electromagnetic waves to be transmitted, means for reducing dielectric losses comprising a composite dielectric member filling the space between said composite members, said dielectric member comprising first and second solid cylindrical members of titanium dioxide separated by spaced discs of titanium dioxide, and dielectric foam material filling the spaces between said cylindrical members and said discs, the dielectric constants of the foam material and the titanium dioxide being such that the overall dielectric constant of the composite members is substantially equal to the transverse dielectric constant of said composite members, and means for short circuiting together all of the conducting cylinders in said first and second composite members at at least one end of said resonator.

References Cited in the file of this patent
UNITED STATES PATENTS

| | | |
|---|---|---|
| 1,701,278 | Silbermann | Feb. 5, 1929 |
| 1,996,186 | Affel | Apr. 2, 1935 |
| 2,228,797 | Wassermann | Jan. 14, 1941 |
| 2,433,181 | White | Dec. 23, 1947 |
| 2,504,178 | Burnham | Apr. 18, 1950 |
| 2,511,610 | Wheeler | June 13, 1950 |
| 2,526,846 | Bowman | Oct. 24, 1950 |

OTHER REFERENCES

Bell System Technical Journal, July 1951, pages 491–529.

Practical Analysis of Ultra High Frequency Transmission Lines, by Meagher and Markley, R. C. A. Service Co. Inc., Camden, N. J. Copyright 1943.